United States Patent [19]

Coombs

[11] Patent Number: 4,937,136

[45] **Date of Patent: * Jun. 26, 1990**

[54] LAMINATE FOR FIRE PROTECTIVE GEAR

[75] Inventor: Christopher E. Coombs, Boonton, N.J.

[73] Assignee: Cairns & Brother, Inc., Clifton, N.J.

[ * ] Notice: The portion of the term of this patent subsequent to Jul. 18, 2006 has been disclaimed.

[21] Appl. No.: 253,709

[22] Filed: Oct. 5, 1988

Related U.S. Application Data

[63] Continuation-in-part of Ser. No. 108,063, Oct. 13, 1987, Pat. No. 4,849,280.

[51] Int. Cl.[5] .............................................. B32B 5/02

[52] U.S. Cl. .................................. 428/233; 428/236; 428/259; 428/284; 428/286; 428/920; 428/921

[58] Field of Search ............... 428/233, 236, 259, 920, 428/921, 284, 286

[56] References Cited

U.S. PATENT DOCUMENTS 4,751,117 6/1988 Goodfellow ........................ 428/259

*Primary Examiner*—Marion C. McCamish

*Attorney, Agent, or Firm*—Louis E. Marn

[57] ABSTRACT

There is disclosed a protective garment having an outer protective shell, a moisture barrier, and an inner thermal liner wherein the inner thermal liner is formed of a non-woven web of a wool blend and another fiber mounted to a woven web of a wool blend and another fiber wherein the wool content of the layer of woven material is greater than the wool content of the non-woven layer.

12 Claims, No Drawings

LAMINATE FOR FIRE PROTECTIVE GEAR

BACKGROUND OF THE INVENTION (1) Related Application

This application is a continuation-in-part of U.S. application Ser. No. 07/108,063 filed Oct. 13, 1987, now U.S. Pat. No. 4,849,280.

(2) Field of the Invention

This invention relates to a protective garment, and more particularly to a fabric laminate for protective garments, particularly for fire fighters for protection from the elements and the hazards of fire fighting.

(3) Description of the Prior Art

Protective gear for fire fighters usually comprises a helmet, heavy protective turnout coat, some form of upper leg protection which produces similar protective characteristics as the coat, boots and gloves. The fire fighter is required to wear such heavy protective equipment to insulate himself from the structural fire with which he is engaged. The environmental conditions which fire fighters encounter in suppressing a typically involve abnormal exposures which can produce an extraordinary number of potentially injuring situations. The fire fighter is typically exposed to intense heat, smoke, and moisture, as well as brief flame exposure. Such environmental conditions are very often compounded by the general character of the ambient weather condition, e.g. extreme cold or extreme heat. The fire fighter's protective outer garment is primarily designed to shed water and other liquids and to thermally insulate the fire fighter from the extraordinary heat associated with his fire suppression activity. Because its protection is so comprehensive, the garment will also protect him from ambient weather conditions, from cold to temperate. But also because of its comprehensive capacity, the garment will overheat the fire fighter in hot weather ambient.

The protective garments presently worn by the fire fighter are comprised of an outer shell of extremely tough fabric for protection, a moisture barrier which serves primarily to shed water and other liquids, and an internal thermal liner. The garment insulation reduces the effect of the environment in which the fire fighter must perform and, because of the physical activity which he must perform, enormous amounts of sweat moisture are generated by the fire fighter's body. Such moisture gathers within the thermal insulating liner. The continued use of a protective garment whose thermal liner has been saturated has a substantial deleterious effect on the fire fighter, both physically and psychologically. Donning a wet garment produces a hypothermic trauma which expends a substantial amount of the fire fighter's energy, and where work, weather ambient or fire heats up the garment, heat stress is often produced. It is commonly held that premature cardiopulmonary aging may result.

The protective garment assembly is the focus of conflicting priorities vis-a-vis as lightweight and comfortable as possible yet providing maximum amount of protection, i.e. to eliminate burn injuries in the most dire circumstances of flashovers for periods exceeding 12 to 15 seconds. Because of the immediate, catastrophic consequence of the latter, the protective garment design has evolved to one of providing an envelope of protection that has as its primary function protecting the fire fighter from the extreme environment. Current estimates indicate that the fire fighter is exposed to this extreme environment for only 5% to 20% of the time during which he must wear his gear. The other 80% to 95% of the time, he is subject to heat stress by overheating inside the garment. In any case, the substantially athletic nature of the work, in hostile or weather ambients, is bound to cause severe heat stress, because of the emphasis in the garment's insulative characteristics.

Heat stress is becoming more and more of a recognized factor in protective garment design, and thereby has lead to the recommendation, incorporation, etc. of GORE-TEX® (a registered trademark of W. L. Gore Associates, Inc.) breathable membranes to replace the neoprene or butyl moisture barriers previously used in protective garments over the last ten years. The moisture barrier provides a significant layer of thermal protection in a flashover situation, and also prevents the intrusion of hostile liquids to the garment's interior. The GORE-TEX® moisture barrier is a barrier to liquid permeation, but not a barrier to vapor permeation. The liquid impervious nature of the GORE-TEX® material, and its inherent high temperature performance render it a very effective and dense heat shield in the extreme flashover environment.

While such a fabric, per se, is an effective moisture barrier and capable of reducing heat, still the potential effectiveness is not fully realized since the moisture barrier is disposed between two relatively water-resistant layers of fabric, i.e. the outer shell and the inner thermal liner. Consequently, both the outer shell and the inner thermal layer reduce the moisture vapor permeability of the moisture barrier to the extent that its effective capacity to transfer vapor and thus heat is reduced to less than one-fifth of its capacity if used alone.

In the above mentioned copending application Ser. No. 07/108,063 filed Oct. 13, 1987, there is disclosed a protective garment having an outer protective shell, a moisture barrier, and an inner thermal liner wherein the inner thermal liner is formed of a non-woven web of a wool blend and another fiber mounted to a woven web of a wool blend and another fiber wherein the wool content of the layer of woven material is greater than the wool content of the non-woven layer. It was believed necessary for moisture vapor transmission that the wool content of the woven layer be greater than the wool content of the non-woven layer, however, effective moisture vapor transmission may be effected with wool contents of the woven layer of less than the wool content of the non-woven layer.

OBJECTS OF THE INVENTION

An object of the present invention is to provide a novel laminate for the inner thermal liner for a protective garment for fire fighters.

Another object of the present invention is to provide a novel fibrous laminate for the inner thermal liner for a protective garment for fire fighters.

Still another object of the present invention is to provide a novel fibrous laminate of varied fiber blends for the inner thermal liner for a protective garment for fire fighters.

Yet another object of the present invention is to provide a novel fibrous laminate of varied fiber blends for the inner thermal liner for enhancing moisture vapor transfer through the inner thermal liner to the moisture vapor permeable moisture barrier.

Another object of the present invention is to provide a novel fibrous laminate of varied fiber blends for the inner thermal liner for increasing the assimilation of sweat moisture and the regulation of large amounts of vapor, delivering such vapor to the vapor permeable moisture barrier, thereby dissipating heat at the skin.

Still another object of the present invention is to provide a novel protective garment for fire fighters including a fibrous laminate for the inner thermal liner for enhancing dissipation of moisture and heat.

A further object of the present invention is to provide a novel protective garment for fire fighters including a fibrous laminate for the inner thermal liner to enhance dissipation of moisture and heat and further including an improved outer shell fabric of reduced weight and increased vapor permeability.

Yet another object of the present invention is to provide a novel protective garment for fire fighters of reduced weight and providing required thermal protection performance factors.

Still another object of the present invention is to provide a novel protective garment for fire fighters of reduced weight and providing enhanced sweat dissipation.

A further object of the present invention is to provide a novel protective garment for fire fighters of reduced weight and providing enhanced body heat dissipation.

Yet still another object of the present invention is to provide a novel protective garment for fire fighters of reduced weight and providing required thermal protection performance factors all acting together to reduce heat stress.

SUMMARY OF THE INVENTION

These and other objects of the present invention are achieved by a protective garment having an outer protective shell, a moisture barrier, and an inner thermal liner wherein the inner thermal liner is formed of a non-woven web of a wool blend and another fiber mounted to a woven web of a wool blend and another fiber wherein the wool content of each layer is between about 35 to 70 percent by weight.

DETAILED DESCRIPTION OF THE INVENTION

In accordance with Applicant s novel contribution, the inner liner for the protective garment is formed to provide a basis for enhanced moisture vapor transmission as well as heat dissipation from the body outwardly through the moisture barrier toward the environment. The inner liner is comprised of a non-woven fabric affixed to a woven fabric. The non-woven fabric is comprised of a blend of wool and a synthetic fiber capable of high temperature performance, with the wool content kept as high as possible without compromising the stability of the fabric's performance at high heats amounting to from 35 to 45 percent by weight, preferably from 40 to 45 percent by weight.

The non-woven fabric may be formed in accordance with diverse processing techniques including lofting, needle punch, knitting, terry pile weaving, sliver knitting, santara, felting, weaving and napping. Needle punch process is particularly useful since the same produces a non-woven fabric exhibiting characteristics of light weight and low density. The woven web is comprised of a blend of wool and a similar, high temperature synthetic fiber, with the wool content kept as high as possible without compromise to high temperature performance, generally with a wool content of from 50 to 70 percent by weight, preferably from 60 to 65 percent by weight.

The synthetic fibers exhibiting such high temperature performance may be selected from the group consisting of acrylic, aramid, asbestos, metallic yarn, nylon, or polyamides, such as NOMEX ®, Kevlar ®, Durette or Fypro, polyimide such as polybenzimidazole available as PBI ®, fluorocarbon elastomers, such as Fluorel and vitons, chloroprene silicone rubber polyurethane, phenolic resin, such as Kynol, fiberglass, cotton, wool, rayon, polyester polyolefins such as polyethylene and polystyrene and preoxidized carbon and mixtures of such materials. Additionally, it will be appreciated that other materials having the desired water impermeability or thermal insulating characteristics may be used in place of those mentioned above.

Preferably, the wool content of the woven web of material is greater than the wool content of the non-woven web of material whereby the wool fiber conductive to vapor transfer begins with as high a concentration as possible next to the user's skin and of reduced concentration or level needed to satisfy the minimum requirement for vapor transfer with concomitant need for high thermal performance and stability in the extreme of a flashover situation. Thus, the inner liner of the present invention permits the transfer of seat moisture (vapor) to the moisture vapor permeable moisture barrier in a more efficient manner than heretofore attained by the thermal liners of the prior art.

The non-woven fabric may be affixed to the woven web of material in accordance with a plethora of processing techniques including quilting, gluing, thermal laminating, needle punching, seam bonding. Quilting is particularly effective in stabilizing the non-woven fabric against the woven web of material. Additionally, quilting techniques provide a minimum of fiber migration in the non-woven fabric and maximizes the layering (air space between subcomponents) for its vapor migration and thermal insulation benefits.

The vapor permeable moisture barrier is permitted to function in a more efficient or effective manner since the moisture barrier is now operating in a vapor or gaseous phase as distinguished from water in the liquid phase, which is the form of perspiration delivered to the moisture barrier by the thermal inner liners of the prior art. Thus, the synthetic fiber inner thermal liners of the prior art condensed the perspiration of the user's body into liquid water and delivered this water to the vapor permeable moisture barrier. The moisture barriers then must await heat generated on the outside of the protective garment to re-vaporize the liquid water and thereby permit functioning of the vapor transfer mechanism of the vapor permeable moisture barrier.

The outer shell of the protective garment may be formed of current outer protective materials, such as NOMEX III ® or the newer PBI ®/KEvLAR ® material. The NOMEX III ® material of the prior art is in a duck weave for the outer protective shell. The new PBI ®/KEYLAR ® material substantially advances the flame and temperature resistance of the outer shell. However, while equal in weight to the NOMEX III ® duck weave, the PBI ®/KEvLAR ® material is woven in the desired rip-stop weave design, thereby substantially enhancing the vapor permeability of the outer shell. NOMEX III ®, because of its superior strength, can be woven in lighter fabric weights, in the rip-stop weave design, and still retain comparatively high mechanical and thermal performance characteristics.

In accordance with a preferred embodiment of Applicant's novel contribution, the outer shell is formed of the NOMEX III ® of material in a rip-stop configuration, which is significantly of lesser weight (about 20%) than an outer shell formed of NOMEX III ® material in a duck weave. NOMEX III ® is readily processed exhibiting excellent properties of durability considering all criteria (heat, sunlight and laundering) of intended usage, as well as its availability. Further, the rip-stop weave of such an outer shell of NOMEX III ® fabric significantly improves the vapor permeability of the outer shell because the yarns are not stacked as tightly as in a duck weave. Consequently, the outer shell has as its primary surface a fabric which is substantially more vapor permeable than an outer shell of NOMEX III ® material in a duck weave. Thus, moisture penetrating or passing to and through the moisture barrier or GORE-TEX ® material from the user's body is provided with a means to reach the surrounding environment of the protective garment with substantially less resistance than when meeting an outer shell of duck or rip-stop weave. A duck weave configuration substantially plugs or significantly slows down the vapor transfer process on the outer surface of the moisture barrier layer of GORTEX ® material, thereby reducing the effectiveness of the moisture barrier.

While the present invention has been described in connection with an exemplary embodiment thereof, it will be understood that many modifications will be apparent to those of ordinary skill in the art and that this application is intended to cover any adaptations of variations thereof. Therefore, it is manifestly intended that this invention be only limited by the claims and the equivalents thereof.

What is claimed:

1. An inner liner laminate for incorporation into an outer protective coating, which comprises:

a layer of non-woven web formed of a blend of wool and a fiber of high temperature performance; and a layer of woven web mounted to said layer of non-woven web and comprised of a blend of wool and a fiber of high temperature performance, a wool content of said layer of woven web being preferably greater than a wool content of said non-woven web.

2. The laminate as claimed in claim 1 wherein said wool content of said woven material is from 50 to 70 percent by weight.

3. The laminate as claimed in claim 2 wherein said wool content of said woven material is preferably from 60 to 65 percent by weight.

4. The laminate as claimed in claim 2 wherein said wool content of said non-woven web is from 35 to 50 percent by weight.

5. The laminate as claimed in claims 2, 3 or 4 wherein said wool content of said non-woven web is preferably of from 40 to 45 percent by weight.

6. The laminate as claimed in claim 1 wherein said fiber of high temperature performance is a synthetic fiber formed of a thermosetting resin.

7. A multilayered protective garment for fire fighting, which comprises:

an outer protective shell;

a moisture barrier layer; and an inner liner comprised of a layer of a non-woven web formed of a blend of wool and a fiber of high temperature performance mounted to said layer of non-woven web, a wool content of said layer of woven web being preferably greater than a wool content of said non-woven web.

8. The multilayered protective garment as defined in claim 7 wherein said wool content of said layer of woven web is from 50 to 70 percent by weight of said wool content of said layer of non-woven web is from 35 to 50 percent by weight.

9. The multilayered protective garment as defined in claim 8 wherein said wool content of said layer of woven web is from 60 to 65 percent by weight and said wool content of said layer of non-woven web is from 40 to 45 percent by weight.

10. The multilayered protective garment as defined in claim 9 wherein said fiber of high temperature performance is a synthetic fiber formed from a thermosetting resin.

11. The multilayered protective garment as defined in claim 7 wherein said outer protective shell is formed of a synthetic fiber formed from a thermosetting resin of a rip-stop weave.

12. The multilayered protective garment as defined in claim 11 wherein said moisture barrier layer is formed of a synthetic fiber formed from a thermosetting resin of a rip-stop weave.

* * * * *